Aug. 8, 1967  SATOSHI WATANABE  3,334,403
APPARATUS FOR MAKING ELECTRICAL DETONATORS
Filed July 26, 1965  5 Sheets-Sheet 1

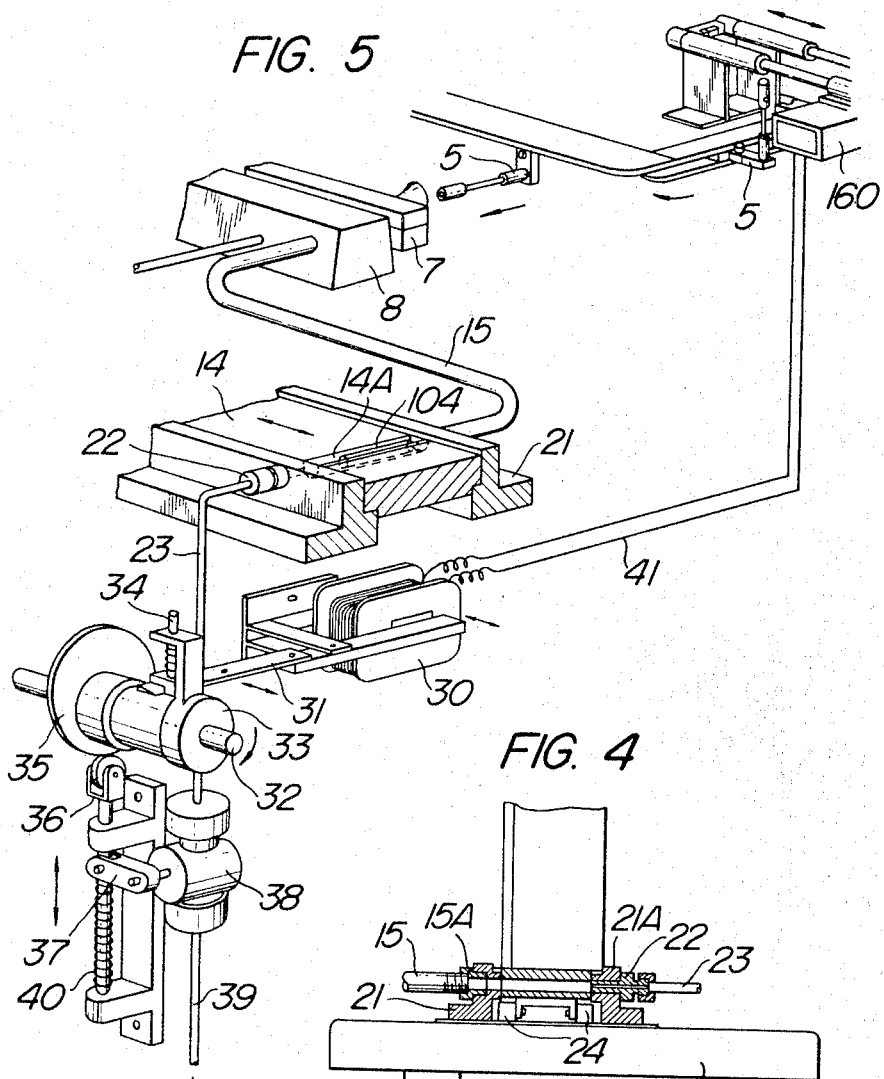

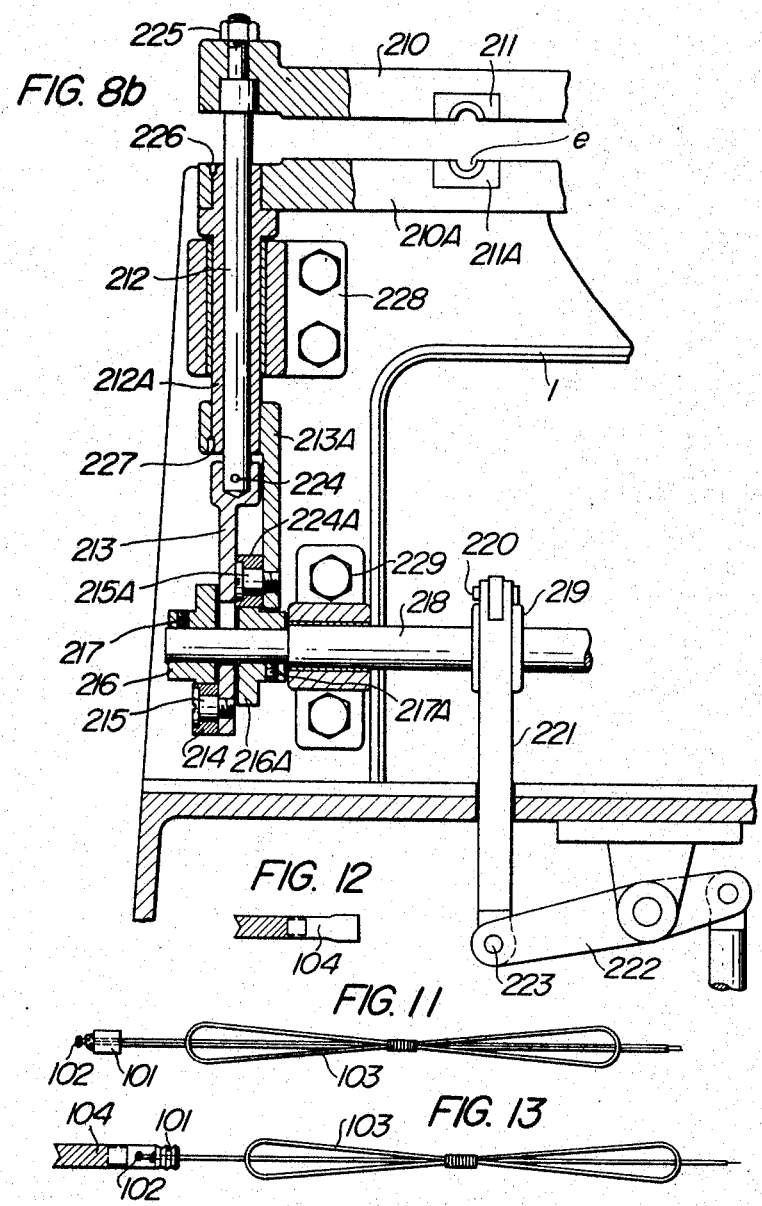

United States Patent Office 3,334,403
Patented Aug. 8, 1967

3,334,403
APPARATUS FOR MAKING ELECTRICAL DETONATORS
Satoshi Watanabe, Nobeoka-shi, Japan, assignor to Asahi Kasei Kogyo Kabushiki Kaisha, Osaka, Japan, a corporation of Japan
Filed July 26, 1965, Ser. No. 474,871
Claims priority, application Japan, Nov. 18, 1964, 39/64,804; Nov. 21, 1964, 39/65,659; Nov. 24, 1964, 39/65,858, 39/65,859; Dec. 16, 1964, 39/70,488
6 Claims. (Cl. 29—203)

ABSTRACT OF THE DISCLOSURE

Apparatus for joining sealing plugs to detonator elements, in which a plurality of sealings plugs each having a fuse head are releasably supported and intermittently rotated along the periphery of a plate and forwardly tilted for being joined in alignment with detonator elements which are fed in response to the presence of the sealing plugs.

This invention relates to an apparatus for use in connection with the manufacture of electrical detonators and the like, and more particularly to an apparatus for automatically and safely joining sealing plugs, each having thereon a fuse head, to detonator elements or blasting caps for thereby obtaining electrical detonators.

Hitherto, the joining operation for attaching a sealing plug having a fuse head thereon to a detonator element has been entirely carried out manually. More precisely, the prior operation has been such that a sealing plug held in the hand of an operator is manually inserted into a detonator element and then both are fastened together by a suitable fastening means or a crimper. However this manual joining operation has involved considerable danger of causing accidental explosion due to possible contact between the fuse head and the inside wall of a shell or a reinforcing capsule of the detonator element when the sealing plug is inserted into the detonator element, because the fuse head is extremely sensitive to friction and shock imparted thereto. It has been proposed to provide a shielding and protecting means to protect operators from such danger, but the provision of such shielding and protecting means has been unacceptable in that added difficulty of the joining operation and lowering of the working efficiency are thereby brought forth. Thus, the joining operation has been the most dangerous and inefficient in the manufacturing process of electrical detonators and the like.

Therefore, the primary object of the present invention is to provide an apparatus for making an electrical detonator which can automatically and mechanically join a sealing plug having a fuse head thereon to a detonator element and thus to attain a safe and efficient joining operation.

According to the present invention, there is provided an apparatus for joining sealing plugs to detonator elements for making electrical detonators comprising a top plate arranged for reciprocating movement over a predetermined limited distance, members for releasably holding therein sealing plugs each having thereon a fuse head, said sealing plug holding members being intermittently movable in groups, each consisting of a plurality of suitably spaced holding members, in a path along the periphery of said top plate and being forwardly tiltable through an angle of 90 degrees, means for detecting the presence of the sealing plugs in said sealing plug holding members, said detecting means being operative in response to the presence of the sealing plugs in said sealing plug holding members to close individual electrical circuits each having therein an electromagnet, detonator element supply means for individually drawing out of a storage casing such number of detonator elements as are required for one joining operation and for supplying the detonator elements to below-mentioned means by being controlled by the operation of said electromagnets, and means for joining in alignment the detonator elements supplied thereto to the sealing plugs held in said sealing plug holding members.

There are other objects, advantages and particularities of the present invention which will become obvious from the following description with reference to the accompanying drawings, in which:

FIG. 4 is an enlarged side elevational view partly in section of the supply means of FIG. 3;

FIG. 5 is an enlarged perspective view of detonator element transporting means employed in the apparatus for cooperation with the supply means of FIG. 3;

FIG. 8b is an enlarged side elevational view of parts of FIG. 8a;

FIG. 11 is a front elevational view illustrative of the shape of the sealing plug having the fuse head attached thereon;

FIG. 12 is a front elevational view illustrative of the shape of the detonator element; and FIG. 13 is a front elevational view illustrative of the shape of an electrical detonator obtained by joining the sealing plug of FIG. 11 to the detonator element of FIG. 12.

Figure 1:
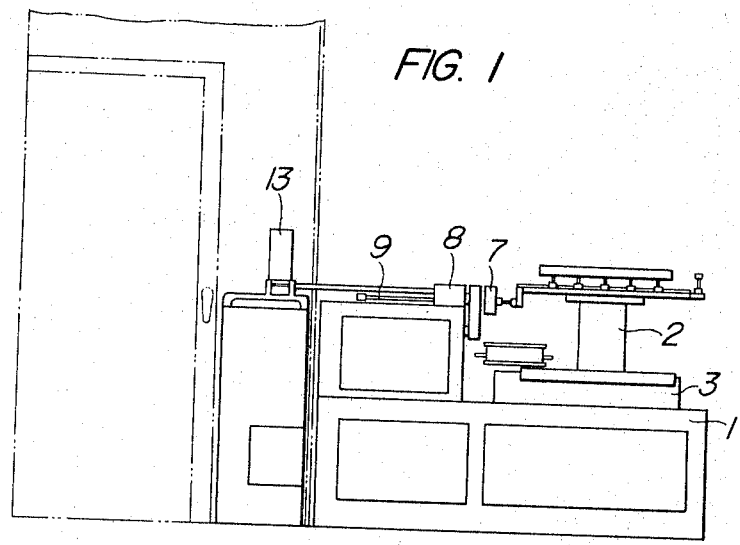
FIG. 1 is a side elevational view diagrammatically showing the electrical detonator making apparatus embodying the present invention.
Figure 2:
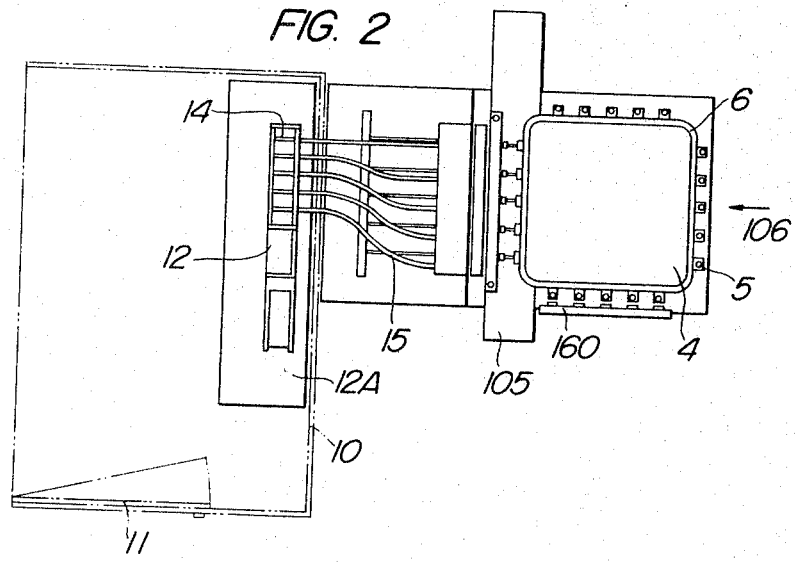
FIG. 2 is a plan view of the apparatus of FIG. 1.

Referring now to FIGS. 1 and 2, the electrical detonator making apparatus of the present invention includes a base block 1 in which a drive means (not shown) is accommodated. Fixedly mounted on the base block 1 is a supporting block 3 on which a slidable block 2 is mounted so as to be slidable back and forth over a predetermined limited distance. A top plate 4 is fixed on the slidable block 2. A guide groove 6 is bored along the entire peripheral edges of the top plate 4, and a plurality of sealing plug holding members 5 spaced apart a predetermined distance therebetween are movably disposed in the guide groove 6. The plug holding members 5 are arranged to move intermittently in groups, that is, each group consisting of several plug holding members 5 is arranged to move at a time about the top plate 4 by being guided by the guide groove 6. An alignment embracing means 7 is provided to embrace from above and below the head portions of the sealing plug holding members 5 when the latter are moved to a position opposite thereto. In opposed relation to the embracing means 7, a fastening or crimping means 8 is provided on the base block 1. A plurality of push rods 9 are arranged to move towards and away from the fastening means 8 so as to urge detonator elements supplied thereto into the fastening means 8. A detonator element supply means 12 is mounted on a surface plate 12A and is provided with a slidable plate 14 which is adapted to make sliding movement to draw out of a detonator element storage casing 13 such number of individual detonator elements which are required for one joining operation. There are provided a plurality of transporting means or tubes 15 in order to transport the detonator elements from the supply means 12 to the fastening means 8 for connection with sealing plugs. The detonator element storage casing 13 is surrounded by explosion-proof walls 10 and a door 11 which can sufficiently withstand the simultaneous explosion of several hundreds of detonators and is completely isolated from the principal parts of the apparatus. A sealing plug detecting means 160 is provided to detect the presence of sealing plugs in the plug holding members 5 and transmit a signal to the detonator element supply means 12 so that the required number of detonator elements can be supplied from the latter. A belt conveyor 105 is provided to carry joined electrical detonators complete with leg wires to a subsequent station. Sealing plugs each having a fuse head thereon are supplied to the apparatus from a supply station 106. According to the present invention, the sealing plugs with fuse heads are manually supplied to the plug holding members from the position of the supply station 106 as shown by the arrow in FIG. 2.

Figure 3:
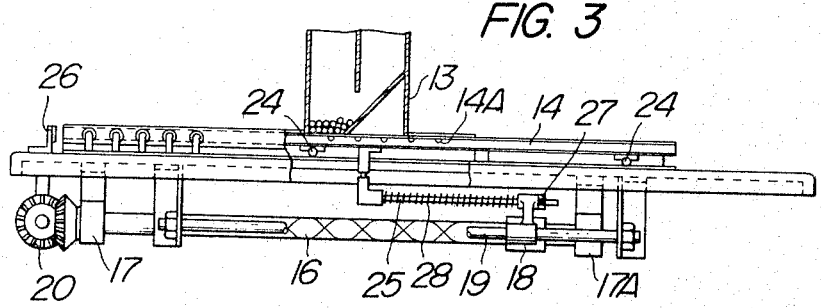
FIG. 3 is a front elevational view partly cut away of detonator element supply means of compressed fluid operated type incorporated in the apparatus of the present invention.

The structure of one form of the detonator element supply means employed in the apparatus of this invention is shown in FIGS. 3 and 4, the supply means in this form being of compressed fluid or air operated type. The detonator element supply means 12 comprises a surface plate 12A on which the detonator element storage casing 13 is mounted with a slidable plate 14 interposed therebetween. The slidable plate 14 is provided with a plurality of grooves 14A each having a suitable cross-sectional shape to receive therein one detonator element. Thus, the detonator elements can be received in the grooves 14A from the storage casing 13 as the slidable plate 14 makes sliding movement below the storage casing 13. This sliding movement of the slidable plate 14 is caused by the rotation of a solid cam 16. Or more precisely, the solid cam 16 is rotatably journalled in bearings 17 and 17A disposed below the surface plate 12A and is rotated from the drive means (not shown) by way of bevel gears 20 and 20A. The rotation of the solid cam 16 causes reciprocating movement of a follower member 18 with a built-in scaphoid follower element by being guided by a guide rod 19. This reciprocating movement of the follower member 18 is transmitted to the slidable plate 14 by way of a connecting rod 25 so that the slidable plate 14 reciprocates back and forth on the surface plate 12A as described above by being guided by guide blocks 21 and 21A. In the guide blocks 21 and 21A, there are provided detonator element discharge ports 15A and compressed air injection ports 22, respectively, which are disposed opposite to each other in axially aligned relation. A transporting tube 15 terminates in each of the discharge ports 15A. An air supply tube 23 is connected with each air injection port 22. Rollers 24 are pivoted to the slidable plate 14 to assist in its sliding movement and the movement of the slidable plate 14 is limited by a stopper 26. When the slidable plate 14 is abutted by the stopper 26 and stops thereat, the grooves 14A on the slidable plate 14 are positioned to axially align with the air injection ports 22 and the detonator element discharge ports 15A so that through passages are thereby formed. When therefore compressed air is injected into the aligned passages through the injection ports 22, the detonator elements in the grooves 14A are discharged through the detonator element discharge ports 15A into the transporting tubes 15. A helical spring 28 is coiled about the connecting rod 25 so as to allow the slidable plate 14 to have a suitable waiting time required for the complete discharge of the detonator elements. Further, a safety pin 27 is provided in order to prevent the detonator element from being exposed by the sliding movement of the slidable plate 14 if for any reason the detonator element may be caught between the detonator element discharge port 15A and the groove 14A. The safety pin 27 may preferably be constructed of a material having a shearing stress less than that of the detonator element per se.

In FIG. 5, there is shown in perspective, the means for transporting the detonator elements drawn out of the storage casing 13 by the above-described supply means 12. In FIG. 5, an electromagnet 30 for each transporting passage is electrically connected with the sealing plug detecting means 160 by way of conductors 41 and is adapted to operate in response to a signal from the detecting means 160. A clutch actuating lever 31 is operatively connected with the electromagnet 30 in a manner to produce a swinging movement when the electromagnet 30 is energized. The free end of the clutch actuating lever 31 is normally held between a clutch 33 and a clutch pin 34. When therefore the clutch actuating lever 31 swings due to the energization of the electromagnet 30 and its free end moves away from the engaged position between the clutch 33 and the clutch pin 34, the clutch pin 34 is caused to move into a groove on a continuously rotating drive shaft 32 so that the clutch 33 makes one turn in unitary relation with the drive shaft 32. A cam 35 is fixed to the clutch 33 and makes one turn in unitary relation with the clutch 33. The rotation of the cam 35 urges a vertically movable actuating rod 36 downwardly which in turn opens a normally closed valve 38 by way of a valve actuating lever 37. A helical spring 40 is provided to normally urge the actuating rod 36 to its upward position, and a fluid or air conduit 39 connects a source of compressed air (not shown) with the valve 38. With the arrangement as described above, when a signal from the sealing plug detecting means 160 energizes the electromagnet 30 and the valve 38 is thereby opened, compressed air supplied through the conduit 39 and the supply tube 23 is injected from the injection port 22 into the groove 14A to urge the detonator element 104 held in the groove 14A of the slidable plate 14, which is in its stopped position, into the fastening means 8 by way of the transporting tube 15. Thus it will be known that no detonator element will be supplied unless a signal is transmitted from the detecting means 160.

Figure 6:
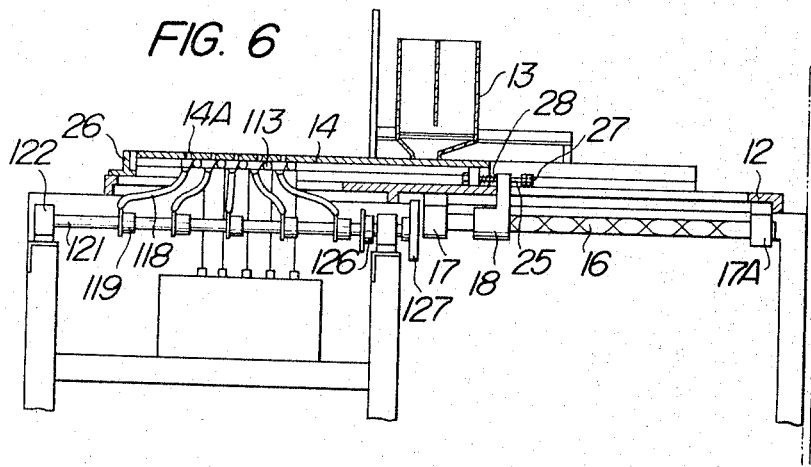
FIG. 6 is a front elevational view partly in section of another form of the detonator element supply and transporting means.
Figure 7:
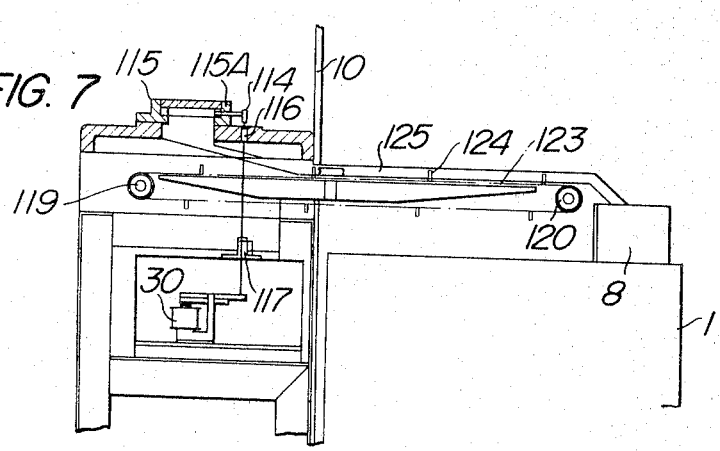
FIG. 7 is a side elevational view partly in section of the supply and transporting means of FIG. 6.

As shown in FIGS. 6 and 7, detonator element supply and transporting means of chain operated type may be incorporated in the apparatus in lieu of the supply and transporting means of the compressed fluid operated type as described above. As in the case of the compressed fluid operated type, the chain operated type of detonator element supply means includes a mounting surface plate 12A on which a slidable plate 14 having grooves 14A is slidable back and forth for thereby drawing such number of individual detonator elements which are required for one joining operation. Also as in the case of the compressed fluid operated type, the sliding movement of the slidable plate 14 is caused by the power transmitted thereto from the drive means through a solid cam 16, follower member 18 and connecting rod 25. In the case of the detonator element supply means of chain operated type, a valve 113 is provided to close the bottom of each groove 14A of the slidable plate 14 and is arranged to be opened and closed through a lever 114 by vertical movement of an actuating rod 116 caused by the operation of an electromagnet 30. The electromagnet 30 is likewise energized by a signal from the sealing plug detecting means 160. A spring 117 for each actuating rod 116 is provided to normally urge the rod 116 downwardly to thereby normally maintain each valve 113 at its closed position. A plurality of detonator element conveyor chains 123, one for each of the grooves 14A, are arranged to run below the grooves 14A of the slidable plate 14 which takes its extreme position at which it is stopped by being abutted by a stopper 26. Receiving troughs 118, one for each groove 14A, are provided at positions immediately below the positions at which the grooves 14A of the slidable plate 14 come to rest. Guide 125 is provided at both sides of the corresponding conveyor chain 123 to guide the detonation element transported by said conveyor chain 123. Lugs 124 are provided on the conveyor chains 123 at a predetermined pitch to positively convey the detonator elements received thereon. Each conveyor chain 123 is tensioned between sprocket wheels 119 and 120 and is continuously moving towards the fastening means 8. A drive shaft 121 for driving the sprocket wheels 119 is journalled in bearings 122 and a sprocket wheel 126 is mounted on the shaft 121 to transmit the driving power from the drive means (not shown) to the shaft 121. A gear 127 is also mounted on the shaft 121 to transmit the rotation of the shaft 121 to the solid cam 16. Therefore, the detonator elements held in the grooves 14A of the slidable plate 14 are discharged when the electromagnets 30 are energized by a signal from the sealing plug detecting means 160 to thereby open the valves 113. The detonator elements thus discharged are received on the conveyor chains 123 by being guided by the receiving troughs 118 and are supplied by being guided by the guide 125 to the fastening means 8 as the conveyor chains 123 progressively move towards the fastening means 8. According to the present invention, therefore, the detonator element supply means of compressed fluid operated type and chain operated type will not supply detonator elements if there is no signal from the sealing plug detecting means 160, that is, when the sealing plug holding members 5 have no sealing plugs therein.

Figure 8A:
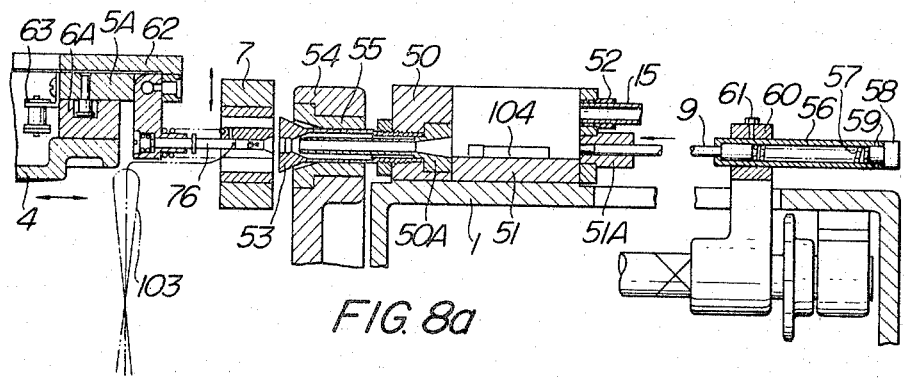
FIG. 8a is a front elevational view partly in section of means for joining in alignment the detonator elements to sealing plugs each complete with a fuse head.

FIG. 8a shows in front elevation the structure of the means for joining in alignment the detonator elements to the sealing plugs each having the fuse head thereon. As shown in FIG. 8a, a mounting block 50 for the fastening means 8 is firmly fixed on the base block 1 and a receptacle 51 for receiving therein the detonator elements 104 is provided rearwardly of the mounting block 50. The detonator elements 104 are supplied into the receptacle 51 by way of the transporting tubes 15 and connecting tubes 52 connected therebetween. The fastening means 8 consists of a plurality of collets 53 for fastening the sealing plugs to the detonator elements and fastening rings 55 for applying fastening pressure to the collets 53. Annular pieces 50A, one for each collet 53, are fixed in screw threaded engagement with the mounting block 50 so as to guide the supply of the detonator elements 104 into the fastening means 8. A fastening block 54 in which the fastening rings 55 are screwed is arranged to reciprocate back and forth over a predetermined limited distance by the drive force from the drive means accommodated in the base block 1. This reciprocating movement of the fastening block 54 causes the movement of the collets 53 relative to the fastening rings 55 so that the collets 53 are alternately contracted and expanded. The extruding movement of the push rods 9 is guided by a guide member 51A. The push rods 9 are slidably received at one end in the guide member 51A so that their sliding movement towards the fastening means 8 can cause the detonator elements 104 supplied in the receptacle 51 to be inserted deep into the collets 53. The other end of each push rod 9 is received in a spring holder 56 of cylindrical shape having a buffer spring 57, a safety pin 59 and a spring retainer 58 so that the safety pin 59 may be broken to stop the extruding operation if a force more than a predetermined value should develop during the extruding operation of the detonator element 104. Thus, safety protection against possible accidental explosion of the detonator due to excessive extruding force can be provided. The push rods 9 are carried by and firmly fixed to a carrier member 60 by set screws 61. The carrier member 60 carrying thereon the push rods 9 is reciprocated back and forth over a predetermined limited distance by a cam means operatively connected to the drive means. On the top plate 4 which is slidable back and forth over the predetermined limited distance as described above, there is provided a plate cam 62 which acts to tilt forwardly through an angle of 90 degrees the successive sealing plug holding members 5 holding therein the sealing plugs 103 each having the fuse head mounted thereon. An endless chain 63 is provided to cause the intermittent travel of the sealing plug holding members 5 in groups in a path along the periphery of the top plate 4. According to the present invention, when the plug holding members 5 carried by the endless chain 63 are successively tilted forwardly through the angle of 90 degrees by the plate cam 62 and are brought to stop at the position opposite the fastening means 8, the embracing means 7 embraces the plug holding members 5 from above and below and holds the latter at the position at which the latter axially align with the corresponding collets 53 of the fastening means 8. Thereafter, the top plate 4 having sealing plug inserting rods 76 is urged towards the embracing means 7 to insert the sealing plugs 101 having fuse heads through bores in the embracing means 7 into the opposed end openings in the collets 53 meanwhile the fastening block 54 is urged towards the embracing means 7 to effect the joining of the detonator elements 104 to the sealing plugs 101.

FIG. 8b shows in fragmentary sectional side elevation the materialized structure and operating mechanism of the embracing means generally designated by reference numeral 7 in FIG. 1. The embracing means 7 comprises an upper member 210 and a lower member 210A which are vertically disposed in parallel so as to be movable relative to each other. The upper and lower members 210 and 210A are provided with aligned embracing portions 211 and 211A, respectively, which are disposed in horizontally spaced pairs of a number corresponding to the number of the plug holding members 5 (FIG. 8a) which are carried to the embracing means 7 during one supply operation. Between the embracing portions 211, and 211A of each pair, there is defined an aperture e for embracing in alignment therein the plug holding member 5. The predetermined number of sealing plug holding members 5 intermittently rotated about the top plate 4 in a group and carried to the embracing means 7 are inserted into the embracing apertures e by the advancing movement of the top plate 4, and are embraced from above and below by the upper and lower members 210 and 210A as will be described later, then are held at respective positions at which they align with the collets 53 (FIG. 8a) of the fastening means 8. Or more precisely, the upper member 210 is connected with an operating shaft 212 by a screw 225 and the operating shaft 212 is in turn connected with an actuating rod 213 by a screw 224. On the other hand, the lower member 210A is likewise connected by a screw 226 with a hollow operating shaft 212A which in turn is connected with an actuating rod 213A by a screw 227. Rollers 214 and 214A are rotatably mounted by pins 215 and 215A on the lower ends of the actuating rods 213 and 213A, respectively. A rotary shaft 218 is provided to operate the actuating rods 213 and 213A and has cams 216 and 216A firmly fixed on one end thereof by pins 217 and 217A, respectively, so that the cams 216 and 216A make peripheral contact with the respective rollers 214 and 214A. The cams 216 and 216A are so shaped that their projected portions are 180° displaced from each other. A lever 219 is operatively connected with the rotary shaft 218 in order to rotate the latter through a predetermined angle and is connected to an actuating rod 221 by a pin 220. A lever 222 connected to the drive means in the base block 1 is connected with the actuating rod 221 by a pin 223. Bearings 228 and 229 fixed to the base block 1 suitably support the operating elements of the embracing means 7. The embracing means 7 operates in the following manner. When at first the lever 222 is actuated by the force from the drive means, the lever 219 is caused to rotate through the actuating rod 221 to thereby rotate the rotary shaft 218 through the predetermined angle. With the rotation of the rotary shaft 218, the cams 216 and 216A rotate through the same angle of rotation. Since the cams 216 and 216A are mounted on the rotary shaft 218 in a manner that their projected portions are 180° displaced from each other as described above, the above-described rotation of the cams 216 and 216A causes the roller 214 to move downwardly and the roller 214A to move upwardly, respectively. Therefore, the upper member 210 of the embracing means 7 is urged downwardly through the actuating rod 213 and the operating shaft 212 by the downward movement of the roller 214, while the lower member 210A is urged upwardly through the actuating rod 213A and the operating shaft 212A by the upward movement of the roller 214A. It will be seen that the downward movement of the upper member 210 and upward movement of the lower member 210A firmly embrace the plug holding members 5 from above and below. After a certain predetermined time, the rotary shaft 218 is reversely rotated by the lever 219 through the predetermined angle and is restored to its original angular position. Then due to such profile of the cams 216 and 216A, the roller 214 is now urged upwardly and the roller 214A is urged downwardly. Therefore, the upper member 210 moves upwardly away from the lower member 210A which moves downwardly to relieve the embracing pressure on the plug holding members 5 and the embracing means 7 stands by to receive the next group of plug holding members 5.

Figure 9:
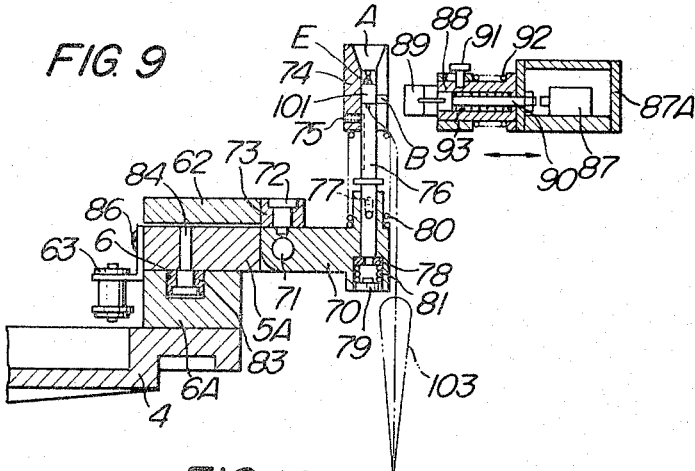
FIG. 9 is a sectional side elevational view of means for holding the sealing plugs each having a fuse head thereon and means for detecting the presence of the sealing plugs.
Figure 10:
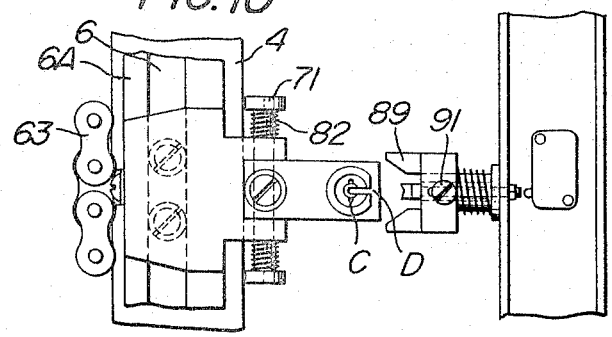
FIG. 10 is a plan view of the sealing plug holding means and detecting means of FIG. 9.

FIGS. 9 and 10 show the detail structure of the means for holding the sealing plugs having fuse heads mounted thereon and means for detecting the presence of such sealing plugs in the holding means. As shown in FIG. 9, a guide block 6A fixedly mounted on the top peripheral face of the top plate 4 has a groove 6 therein in which a plurality of suitably spaced pieces 5A are slidably fitted. A support 70 is tiltably mounted by a pivot pin 71 on each slidable piece 5A for supporting thereon the sealing plug holding member 5. A roller 73 is rotatably mounted by a pin 72 on each support 70 so as to make a rolling contact with a plate cam 62 and to tilt the support 70 forwardly through an angle of 90 degrees through cooperation with the plate cam 62. On one end of this support 70, a holding ring 74 is resiliently mounted with a coil spring 80 interposed therebetween and also a plug inserting rod 76 is slightly movably mounted by means of a pin 77. The holding ring 74 is provided with a conical aperture A at its top end for guiding therein the detonator element, a detecting rod receiving port B on its side wall, an axial bore E for holding therein the sealing plug, and a groove C (FIG. 10) provided internally of the bore E. A guide groove D is provided to insert easily sealing plug 101 connected with a leg wire 103 on the side wall of the holding ring 74. A set screw 75 extends through the wall of the holding ring 74 into an axial groove on the plug inserting rod 76 to provide slidable connection therebetween. The plug inserting rod 76 has on its top end a projection which fits in the groove C in the holding ring 74. This is in order to prevent the sealing plug from being forced into the detonator element more than is desired during the plug inserting operation. The plug inserting rod 76 is normally urged upwardly in FIG. 9 by a coil spring 81 interposed between backing plates 78 and 79. A coil spring 82 is coiled about the pin 71 in order to restore the support 70 tilted through 90 degrees to its normal upward position. The plug holding member 5 having the structure as described above is slidably fitted in the groove 6 of the guide block 6A by means of a pin 84 and a roller 83 mounted thereon, and a plurality of such plug holding members 5 are intermittently moved in a group about the top plate 4 by being guided by the groove 6 as previously described. The intermittent movement of the plug holding member group is caused by the endless chain 63 to which the slidable pieces 5A are fixed by set screws 86.

Sealing plug detecting means 160 for detecting the presence of sealing plugs held in the plug holding members 5 and transmitting a signal to the detonator element supply means 12 depending on the result of detection so as to cause the supply means 12 to supply a necessary number of detonator elements comprises a plurality of detecting units each of which consists of a body 88, a plug detecting rod 90 reciprocatingly mounted in the body 88 through a coil spring 93 interposed therebetween, a microswitch 87 adapted to be actuated by the detecting rod 90 and a guide member 89. The microswitches 87 are enclosed in a switch box 87A. A pin 91 fixes the guide member 89 in a manner to allow for slight free movement of the latter which is restored to its original position by a coil spring 92. The detecting units of the plug detecting means 160 are opposed by the plug holding members 5 when the latter are at rest and adapted to be actuated by a cam means (not shown) connected with the drive means so as to move towards and away from the plug holding members 5. The movement of the plug detecting means 160 towards the plug holding members 5 causes each detecting rod 90 to move through the receiving port B into the holding ring 74 to detect the presence of the sealing plug therein. When the sealing plug is held in the holding ring 74 and the detecting rod 90 contacts the plug, the detecting rod 90 drives the microswitch 87 to its on-position which in turn energizes the corresponding electromagnet 30 of the detonator element supply means 12 described previously. Therefore if no plug is present in the holding ring 74, the microswitch 87 would not be actuated and there is no supply of the detonator element.

The sealing plug having the fuse head mounted thereon has a shape generally as shown in FIG. 11, in which the sealing plug is designated by reference numeral 101, the fuse head by 102 and the leg wire by 103. The detonator element has a shape generally as shown in FIG. 12. FIG. 13 shows the shape of an electrical detonator which is obtained by joining the sealing plug 101 with the fuse head 102 to the detonator element 104.

The electrical detonator making apparatus according to the present invention having the structure as described above operates in the following manner to automatically and mechanically join the sealing plug with the fuse head as shown in FIG. 11 to the detonator element as shown in FIG. 12. Or more precisely, the sealing plugs 101 with the fuse heads mounted thereon as shown in FIG. 11 are supplied by manual means from the supply station 106 as shown in FIG. 2 to the plug holding members 5. The plug holding members 5 holding therein the plugs 101 are intermittently moved in a group of several members about the periphery of the top plate 4 and are brought to stop at the position opposite the plug detecting means 160. Upon stoppage of the plug holding members 5 at this position, the plug detecting means 160 as shown in FIG. 9 is moved towards the plug holding members 5 by being urged by the cam means connected with the drive means and the tip of each detecting rod 90 advances through the receiving port B into the holding ring 74 to detect the presence of the plug 101 in the holding member 5. When the plug 101 is held in the holding ring 74, the detecting rod 90 drives the microswitch 87 to its on-position to thereby close the circuit having the electromagnet 30 therein. The microswitch 87 is not actuated when there is no plug 101 in the holding ring 74. In case the detonator element supply means 12 of compressed air operated type as shown in FIGS. 3, 4 and 5 is employed, energization of the electromagnet 30 in each circuit due to the presence of the plug 101 in the plug holding member 5 causes disengagement of the clutch actuating lever 31 by the attraction by the magnet 30 and the clutch 33 and the cam 35 make one turn. The rotation of the cam 35 causes downward movement of the valve actuating rod 36 to open the compressed air valve 38. Meanwhile, the slidable member 14 having received the detonator elements 104 from the detonator element storage casing 13 and having one detonator element 104 held in each of its grooves 14A is at rest at the position at which it is abutted by the stopper 26. Therefore, since the grooves 14A align with both of the compressed air injection ports 22 and the detonator element discharge ports 15A to form through passages, injection of the compressed air into the aligned passages by the opening of the valve 38 forces the detonator elements 104 in the grooves 14A through the transporting tubes 15 into the detonator element receptacle 51 in the fastening means 8.

In case the detonator element supply means of chain operated type as shown in FIGS. 6 and 7 is employed, energization of the electromagnet 30 in each circuit causes upward movement of the actuating rod 116 to thereby open through the lever 114 the valve 113 provided at the bottom of each of the grooves 14A in the slidable plate 14 which is at its waiting position. Opening of the valves 113 allows the detonator elements 104 received in the grooves 14A to freely fall onto the receiving troughs 118. Thus, the detonator elements 104 are guided by the receiving troughs 118 onto the conveyor chains 123 whose advancing movement carries the detonator elements 104 towards the fastening means 8.

At the completion of above detection on the plugs 101, the detecting means 160 is moved away from the plug holding members 5 and the microswitches 87 spring back to the off-position to close the valves 38 in the case of compressed air operated type and the valves 113 in the case of the chain operated type of supply means 12. It will thus be understood that, according to the present invention, the detonator elements 104 are supplied only when the plugs 101 are present in the plug holding members 5 regardless of the type of supply means, i.e. either compressed air operated type or chain operated type. The manner of operation of the apparatus after the detonator elements have been supplied into the fastening means 8 is entirely the same for both of the apparatus provided with the compressed air operated type and chain operated type of supply means. Or more precisely, rotation of the solid cam 16 causes the slidable plate 14 to slide on the surface plate 12A through the action of the follower member 18 and the connecting rod 25 until the slidable plate 14 is abutted by the stopper 26. During the movement of the slidable plate 14 towards the stopper 26, it receives the detonator elements 104 in its grooves 14A from the storage casing 13 and is finally abutted by the stopper 26 to stop thereat to prepare for the next operation. As shown in FIG. 8a, the detonator elements 104 fed into the receptacle 51 are forced into the collets 53 by the push rods 9. On the other hand, the plug holding members 5 having been detected for presence of the sealing plugs 101 therein by the detecting means 160 are moved about the top plate 4, are successively tilted forwardly through the angle of 90 degrees by the plate cam 62 and are brought to stop at the position opposite the fastening means 8. As soon as the plug holding members 5 take their stationary position opposite the fastening means 8, the embracing means 7 embraces them from above and below to hold them at respective positions at which they align with the corresponding fastening units of the fastening means 8. Simultaneously with the embracement of the plug holding members 5 by the embracing means 7, the top plate 4 mounted on the slidable block 2 is advanced a predetermined limited distance by the cam means connected with the drive means, and the sealing plugs 101 each having the fuse head 102 mounted thereon and held in the plug holding members 5 are forced into the openings of the corresponding detonator elements 104 in the collets 53 by the plug inserting rods 76. After the insertion of the plugs 101 into the detonator elements 104, the fastening block 54 is advanced to apply compression to the collets 53 by the fastening rings 55. This compression causes each detonator element 104 in the collet 53 to be firmly joined to the corresponding sealing plug 101 so that the electrical detonator as shown in FIG. 13 can be obtained. After the joining operation, the top plate 4, the fastening block 54 and other moving means are retracted to their original positions by the drive means and the electrical detonators thus obtained are fed to the succeeding station by the conveyor 105.

From the foregoing detailed description it will be understood that, according to the present invention, the joining operation which has heretofore been the most dangerous of the manufacturing steps of electrical detonators can completely be automated and mechanized, which brings forth a remarkable improvement in the freedom from danger and an improved operating efficiency. It will be appreciated that complete isolation of the detonator storage casing from the sealing plug supply station and the principal parts of the apparatus by means of the explosion-proof walls and the automated supply of detonator elements are especially advantageous in that no danger whatsoever will be exerted on the operators even if the detonator elements in the storage casing should explode for any reason and any dangerous operation in which the operators directly handle the dangerous detonator elements by hand is thus completely eliminated.

What is claimed is:

1. Apparatus for joining detonator elements to sealing plugs for making electrical detonators comprising a top plate arranged for reciprocating movement over a predetermined limited distance, members for releasably holding therein sealing plugs each having thereon a fuse head, said sealing plug holding members being intermittently movable in groups each consisting of a plurality of suitably spaced holding members in a path along the periphery of said top plate and being forwardly tiltable through an angle of 90 degrees, means for detecting the presence of the sealing plugs in said sealing plug holding members, said detecting means being operative in response to the presence of the sealing plugs in said sealing plug holding members to close individual electrical circuits each having therein an electromagnet, detonator element supply means for individually drawing out of a storage casing such number of detonator elements as are required for one joining operation and for supplying the detonator elements to below-mentioned means by being controlled by the operation of said electromagnets, and means for joining in alignment the detonator elements supplied thereto and the sealing plugs held in said sealing plug holding members.

2. Apparatus according to claim 1, in which said sealing plug holding members each comprise a support movably and forwardly tiltably mounted on said top plate, a sealing plug holding ring having an axial bore for holding therein the sealing plug and resiliently mounted on said support by means of a compression spring interposed therebetween, a port bored in the side wall of said sealing plug holding ring for receiving therein a sealing plug detecting rod, a sealing plug inserting rod axially movable in the axial bore in said plug holding ring and having a projection at its top end to limit its axial movement, said plug inserting rod being mounted at its lower end in said support by means of a compression spring so as to be slightly axially movable, and means cooperating with a cam plate so as to tilt said support forwardly through an angle of 90 degrees during the intermittent movement of said support in the path along the periphery of said top plate.

3. Apparatus according to claim 1, in which said sealing plug detecting means is arranged to move towards and away from said sealing plug holding members and comprises a plurality of sealing plug detecting unit consisting of a body, a rod for detecting the presence of a sealing plug held in said sealing plug holding member provided in said body by way of a spring, a microswitch actuated by said rod, to close an electrical circuit having an electromagnet, and a guide plate slightly movably mounted on said body and restored to its original position by a coil spring.

4. Apparatus according to claim 1, in which said detonator element supply means comprise compressed air supply means including a plurality of pin clutches each adapted to be actuated by the energization of the corresponding one of said electromagnets, a cam operatively connected with each of said clutches for making one rotation when said clutch is actuated, a valve actuating rod contacted by each of said cams and vertically movably disposed so as to make vertical movement following the contour of said cam, and a compressed air supply valve opened and closed by the vertical movement of each of said actuating rods, detonator element drawing means for individually drawing detonator elements from a storage casing, said drawing means including a slidable plate having a plurality of grooves for receiving therein the detonator elements and being moved reciprocatingly by the rotation of said solid cam, and a coil spring for allowing said slidable plate to remain in its stopped position for a substantial time required for the complete discharge of the detonator elements therefrom, and transporting means for transporting the detonator elements drawn out by said drawing means towards said joining means by the compressed air supplied from said compressed air supply means during the time in which said slidable member is held in its stopped position.

5. Apparatus according to claim 1, in which said detonator element supply means comprises detonator element drawing means for individually drawing detonator elements from a storage casing, said drawing means including a slidable plate having a plurality of grooves for receiving therein the detonator elements and being moved reciprocatingly by the rotation of said solid cam, and a coil spring for allowing said slidable plate to remain in its stopped position for a substantial time required for the complete discharge of the detonator elements therefrom, means operative in response to the energization of said electromagnets to open normally closed valves provided at the bottom of said grooves in said slidable plate to discharge the detonator elements therethrough, and transporting means including endless conveyor chains for transporting the detonator elements discharged through said valves towards said joining means.

6. Apparatus according to claim 1, in which said joining means for joining the detonator elements to the sealing plugs each having a fuse head thereon comprises fastening means including a fastening block arranged for reciprocating movement over a predetermined limited distance, a plurality of fastening rings firmly held in said fastening block, and a collet fitted in each fastening ring for applying fastening pressure to the detonator element and the sealing plug, embracing means disposed opposite said fastening means for aligning and embracing the sealing plugs during the joining operation, and a plurality of push rods for urging the detonator elements into said collets.

References Cited
UNITED STATES PATENTS

| | | | |
|---|---|---|---|
| 2,768,428 | 10/1956 | MacGregor et al. | 29—203 |
| 2,797,608 | 7/1957 | Huyett | 29—203 X |
| 2,987,804 | 6/1961 | Nichol | 29—155.55 X |
| 3,213,406 | 10/1965 | Just et al. | 29—203 X |
| 3,222,597 | 12/1965 | Bentenbough et al. | 29—407 X |

JOHN F. CAMPBELL, *Primary Examiner.*

THOMAS H. EAGER, *Examiner.*